(12) United States Patent
Ziemer

(10) Patent No.: US 6,746,354 B1
(45) Date of Patent: Jun. 8, 2004

(54) DRIVE SYSTEM FOR A MOTOR VEHICLE

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/979,279

(22) PCT Filed: May 15, 2000

(86) PCT No.: PCT/EP00/04346
§ 371 (c)(1),
(2), (4) Date: Jan. 17, 2002

(87) PCT Pub. No.: WO00/71887
PCT Pub. Date: Nov. 30, 2000

(30) Foreign Application Priority Data

May 21, 1999 (DE) .......................... 199 23 316

(51) Int. Cl.$^7$ ................ F16H 3/72; F16H 37/06
(52) U.S. Cl. .................. 475/5; 475/149; 475/339; 475/341
(58) Field of Search .............. 475/5, 149, 314, 475/320, 339, 340, 341, 342, 8, 10

(56) References Cited

U.S. PATENT DOCUMENTS

| | | | | |
|---|---|---|---|---|
| 4,702,125 A | * | 10/1987 | Kalns | 475/205 |
| 5,285,111 A | * | 2/1994 | Sherman | 290/4 C |
| 5,643,119 A | * | 7/1997 | Yamaguchi et al. | 475/5 |
| 5,771,478 A | * | 6/1998 | Tsukamoto et al. | 701/68 |
| 5,895,333 A | * | 4/1999 | Morisawa et al. | 475/5 |
| 6,258,001 B1 | * | 7/2001 | Wakuta et al. | 475/5 |
| 6,306,057 B1 | * | 10/2001 | Morisawa et al. | 475/5 |
| 6,371,877 B1 | * | 4/2002 | Schroeder et al. | 475/5 |
| 6,428,442 B1 | * | 8/2002 | Turgay et al. | 475/321 |
| 6,474,428 B1 | * | 11/2002 | Fujikawa et al. | 475/5 |
| 6,612,203 B2 | * | 9/2003 | Sakamoto et al. | 74/665 A |

FOREIGN PATENT DOCUMENTS

| | | | | |
|---|---|---|---|---|
| DE | 89 14 904.1 | | 3/1990 | F02N/11/04 |
| DE | 41 12 215 C1 | | 9/1992 | F02N/11/04 |
| DE | 197 02 198 A1 | | 7/1998 | F16H/3/44 |
| JP | 3-81562 A | | 6/1991 | F02N/11/04 |
| WO | 99/29533 | * | 6/1999 | 475/5 |

OTHER PUBLICATIONS

Ott, Ing. A., Zur systematischen Synthese mehrgängiger Umlaufräder–Schaltgetriebe, *ATZ Automobiltechnische Zeitschrift 70* (1968) 3, pp. 104–108.

Herschel, Dr. D., "Grundgesetze von Umlaufrädergetrieben", *Militärtechnik* 4/88, pp. 211–213.

Looman, Prof. Dr.–Ing. J., "Planetengetriebe, das Kernstück automatischer Fahrzeuggetriebe", *Machinenbautechnik*, Berlin 39, 1990, 10, pp. 451–455.

"Europe–an Automotive Design", Ausgabe, Apr. 1998, p. 24.

* cited by examiner

*Primary Examiner*—Tisha D Lewis
(74) *Attorney, Agent, or Firm*—Davis & Bujold PLLC (57) ABSTRACT

A drive system for a motor vehicle with a starter and generator unit (1) connected to a drive shaft (6) integrated in a drive train. The starter and generator unit (1) possesses an electrical machine (8, 9) operable as an electric motor with start-function or as an electrical generator and a planetary drive (10) with at least one sun gear (16, 28), at least one planet gear (17, 17') and at least one internal gear (18, 27). In this arrangement, the planetary drive (10) is so connectable by means of shafts (12, 13, 31) and clutches (14, 15, 15', 15", 15'", 29, 30, 32, 34, 36 to 41) to the electrical machine (8, 9), to the drive shaft (6) and to a housing (3, 4) of an assembly located in the said drive train, that in a start operation, adjustment can be made for a ratio of i>1 and in a generator operating mode, a ratio of i=1. The starter and generator unit (1) is placed in the housing (3, 4) in a zone, in which the drive shaft (6), or a shaft (5) fixed to rotate therewith, penetrates through said housing (3, 4) opposite which zone, the encompassing extent of the housing (3, 4) is sealed.

20 Claims, 9 Drawing Sheets

DRIVE SYSTEM FOR A MOTOR VEHICLE

FIELD OF THE INVENTION

The invention concerns a drive system for a motor vehicle with a combination starter-generator unit.

BACKGROUND OF THE INVENTION

In accord with conventional usage, internal combustion motors of powered vehicles have been driven at such speeds of rotation by means of a starter, which is a direct current motor, that the internal combustion motor can then function of its own accord. As this happens, the starter motor torque is transferred by means of a pinion gear to the flywheel of the motor. This known starter is so flanged to a motor block so that, upon a start procedure, the pinion gear meshes with a ring gear on the flywheel in order, thereby, to set the motor into rotary motion.

An internal combustion motor is normally brought to a rotary speed of ca. 300 RPM by the starter. From this relative small speed of rotation, an internal combustion engine will become self energizing and regulates itself to an idling rotational speed which, for example, runs about 700 RPM. When the internal combustion motor is running, then a separate generator current is produced for charging the vehicle battery. The said generator is usually run by a V-belt or toothed belt drive connection.

In separated systems of this type, two electrical machines are disadvantageously installed, the first for the starting an internal combustion machine and the second for the production of the said current, whereby the advantage of an electrical machine, which is that it can be run both as a generator as well as a motor, is not made use of.

In order to efficiently design the current supply of a motor vehicle, increasing developments have been undertaken which have the goal of combining the function of starting motor and current generation into one component.

One of the solutions to the problem has been made known in the publication "European Automotive Design", issue for April 1998, pg. 24. In this case, an electric motor is connected directly with the crankshaft of the internal combustion motor. By means of the electric motor, which is installed as a power device between the internal combustion motor and the transmission, the starter function and the generator function can be both carried out. In this case, the design of the electric motor is essentially directed toward the starting requirement.

Together with power electronics and a start-condenser as a storage medium, this known electric motor now replaces a conventional starter, the generator and the flywheel of the motor vehicle and controls, as a generator, the supply of electrical energy.

Looking toward the future and giving consideration to the installation of start-stop automation, by means of which the internal combustion motor will be shut off during vehicle stillstand to save fuel, progressively shorter startup times with simultaneous noise level reduction will be demanded. This involves an increase in the loading on the starter and an increase in size of the electric motor which will then be over-dimensioned for operation as a generator. Further, the installation of larger electric motors, because of the very limited available space, leads to additional problems.

In order to be able to install a smaller motor as a starter, it is possible to install an intermediate drive, i.e., a starter-drive, between the electric motor and the crankshaft in order to make the necessary torque to the crankshaft during the start available.

After the start has been consummated, however, the ratio in the generator train is undesirable since the generator should be driven in concert with the crankshaft rotation in order to develop a corresponding charging current. In order to make this possible, a starter-drive, which possesses a planetary drive with clutch procedures or overrunning clutches, is tried. In this arrangement, during the starting operation a ratio of i=3 to i=4 is employed while, in the generator mode, a ratio of i=1 is made possible.

The starter-drive for the above described application is placed in an intermediate housing as a self-sufficient component between the internal combustion motor and a torque converter of the vehicle transmission. The said starter drive disadvantageously exhibits an installation size which, to a certain extent, favors the advantages of smaller motors.

Another problem is the time and cost disadvantage of construction with a substantial multiplicity of components, wherein air removal of a rotating unit and a self contained lubrication system is necessary. Additional dynamic sealing means were required, for the sealing of the intermediate housings, which disadvantageously give rise to an increased torque drag.

SUMMARY OF THE INVENTION

The purpose of the present invention is to create a drive system for a motor vehicle wherein the advantages of an electrical machine are used to the extent that purpose further encompasses an integration of the said electrical machine into the drive train in the most simple constructive manner and to accomplish the said integration in small space requirement.

In accord with the invention, this purpose is achieved by a drive system.

In the case of the drive system in accord with the invention, in every case, the expense in time and money and the number of the components is reduced, whereby, in an advantageous manner, the motor compartment space and weight are minimized and the costs of manufacturing are lowered.

Besides a simplified lubrication sealing and ventilating method by means of the integration of the starter and generator unit into an assembly of the drive train, the efficiency is increased because of discarding additional dynamic sealing means in comparison to a construction as a self-contained component.

BRIEF DESCRIPTION OF THE DRAWINGS

The invention will now be described, by way of example, with reference to the accompanying drawings in which.

DETAILED DESCRIPTION OF THE INVENTION

In every case, FIGS. 1 to 18 have in common, a starter and generator unit 1 is shown which is located in an assembly 2 of a drive system for a motor vehicle. In the various depicted embodiments, this assembly, in which the starter and generator unit 1 is integrated, actually is a vehicle transmission 2, wherein the starter and generator unit 1 is enclosed in a housing 3 of the said vehicle transmission 2, which housing is sealingly closed by a bolted on cover 4. In this arrangement, the starter and generator unit 1 finds itself in an area, in which an output drive shaft 6, in a turn-fixed connection with a crankshaft 5, passes through the housing cover 4. The passage of the drive shaft 6 through said cover 4 towards the motor side is sealingly protected against the environment by a sealing means 7 of the housing 3.

In an alternative embodiment, the starter and generator unit 1 can analogously be placed in a housing for a drive motor or the housing of a differential.

In the following, different types of construction and arrangements of the starter and generator unit 1 are described wherein, for simplification, similarly functional components are given the same reference numbers.

The starter and generator unit 1 possesses an electrical machine 8 which is operable either as an electric motor with a start-function, or as an electrical generator with a rotor 9. A planetary drive 10 with a planetary gear set 11 is provided for the transference of the torque from the electrical machine 8, whereby a first shaft 12 of the planetary drive 10 is coupled with the rotor 9 of the electrical machine 8. Given at least one additional shaft 13 and clutches, of which a clutch 14 is leading to the transmission housing 3, that is, the cover 4 thereof and an additional clutch 15 is leading to the drive shaft 6, then a ratio i, which is greater than 1, can be input during a start-operation. In a condition of driving, that is generator operation, a ratio of i=1 can be attained, whereby the planetary gear set 11 is blocked.

The planetary drive 10 is placed in the closed housing 3 of the vehicle transmission 2 without its own sealing means, whereby any sealing expense for the planetary drive 10 no longer applies. By means of the sealing means 7 of the transmission housing, which in any case is present, assurance is given that no contaminating dirt will enter the planetary drive 1. For the same reason, the area between the rotor 9 and a stator surface on the electrical machine remains dirt-free and a contamination-based occurrence of drag torque is avoided.

Figure 1:
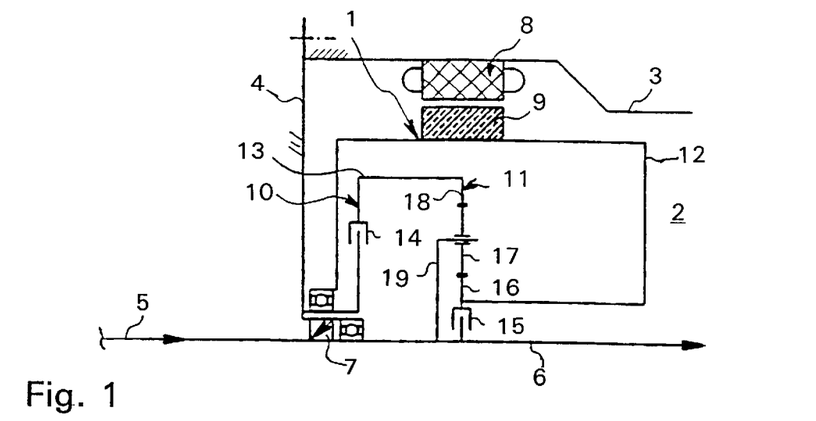
FIG. 1 is a presentation showing principles of a starter and generator unit of a drive system for a motor vehicle which is integrated in a housing of a vehicle transmission.
Figure 2:
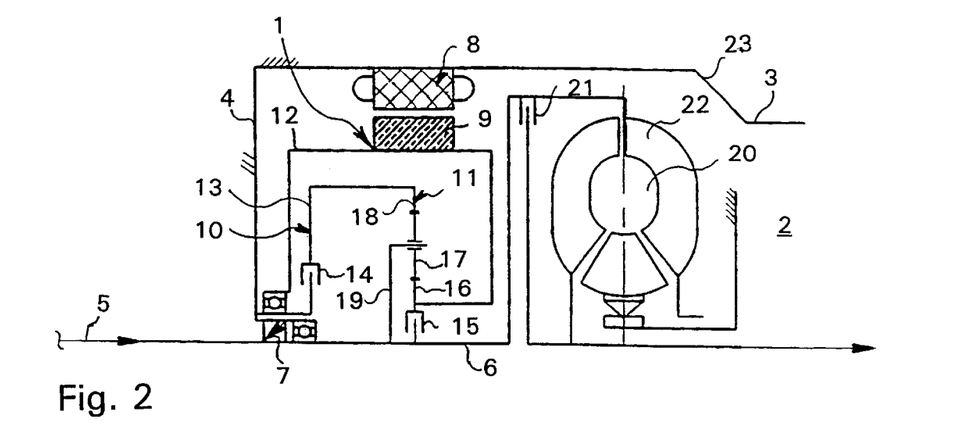
FIG. 2 is a presentation showing principles of a starter and generator unit similar to FIG. 1, which is integrated a converter housing on a side of a torque converter remote from the vehicle transmission.
Figure 3:
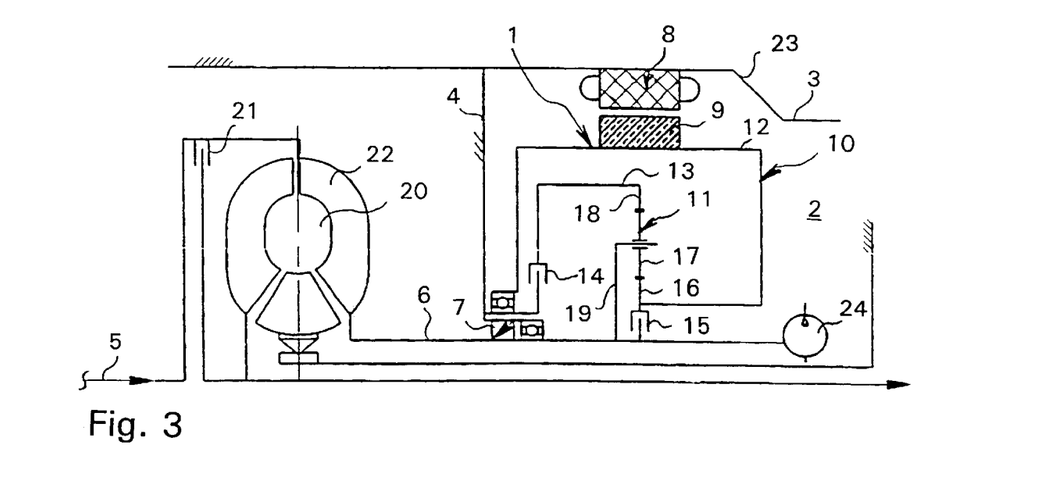
FIG. 3 is a starter and generator unit in accord with FIG. 1, which is integrated in a converter bell between a torque converter and a pump of the transmission.

Especially considering FIGS. 1 to 3, a simple outline of the planetary drive 10 with the planetary gear set 11 is shown which, in each example, includes a sun gear 16, the present three planetary gears 17 and an internal gear 18. In these illustrations, the planetary gears 17 are seated on a planetary gear carrier 19, which is adapted as a spider of the drive shaft 6. The sun gear 16 is affixed to turn with the first shaft 12 upon which the rotor 9 of the electric machine 8 is mounted. The internal gear 18, by means of the additional shaft 13 and the clutch 14, can be anchored to the housing 3, that is to say with the cover 4 of said housing, for the purpose of adjusting a start ratio which would be greater than 1. In the case of a starting procedure, first the shaft 12 rotates carrying the sun gear 16 and the rotor 9 with it. At the same time, the planetary drive 10, by means of the internal gear 18, is supported by the shaft 13 and the closed clutch 14. By means of the planet carrier 19, which is driven by the planetary gear 17, the starting torque is communicated to the output drive shaft 6. In the case of generator operation, that is in the usual driving mode, conversely to the above, the clutch 14 which connects the internal gear 18 with the cover 4 is opened, and the successive clutch 15 which joins the sun gear 16 with the drive shaft 6 closes. As this occurs, the generator torque delivered by the drive shaft 6, through the clutch 15, is transmitted to the rotor 9 which is to be found on the shaft 12. The drive shaft 6 and a pump shell 22, of the torque converter 20, is affixed to turn with crankshaft 5.

Although the starter and generator unit 1 is placed in a bell housing 23 of the general housing 3, on the side of the torque converter 20, remote from the vehicle transmission 2 in FIG. 2, the starter and generator unit 1, in accordance with the construction style in FIG. 3, is placed on the side of the torque converter 20 proximal to the vehicle transmission 2.

The placement of the starter and generator unit 1 between the torque converter 20 and the vehicle transmission 2, that is to say between the torque converter 20 and an oil pump 24 of said transmission 2, in all events, is advantageous since the torque converter 20, as a delivery-component, can simply be slipped on after installation of the starter and generator unit 1.

FIGS. 4 to 8 each show a common mode of construction of the planetary drive 10 and the planetary gear set 11 with planetary gears 17' designed as stepped-planetary gears. With such gears, advantageously greater ratios are possible, for example wherein i>3, than in comparison with non-stepped planetary gears where smaller or equally sized internal gear diameters. The stepped planetary gears 17' are designed with a small step gear 25 and a large step gear 26.

Figure 4:
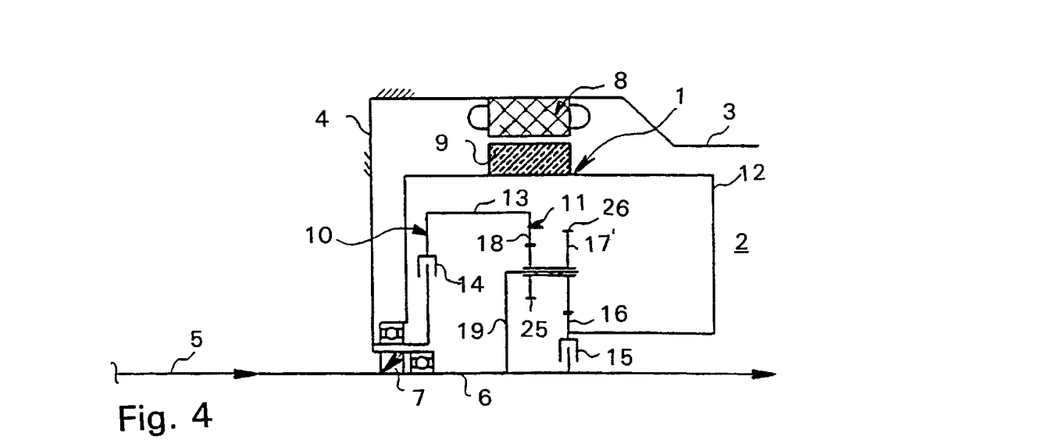
FIG. 4 is a planetary gear set of a starter and generator unit with stepped planet gears, a sun gear and one internal gear.

In FIG. 4, a design of the planetary gear set 11 with the sun gear 16 and the internal gear 18, in accord with the arrangements presented in FIGS. 1 to 3, is shown. In these said arrangements, the sun gear 16 engages with the large step gear 26 and the internal gear 18 engages with the small step gear 25 of the stepped planetary gears 17'.

During a start procedure, the internal gear 18 is set stationary. The torque of the electrical machine 8 is directed through the sun gear 16 and by means of the planetary gear carrier, that is the spider 19, to the drive shaft 6 which shaft is so affixed, under these conditions, so as to turn with the crankshaft 5. The clutch 15 is at this time open.

During the normal driving mode, that is generator operation, the planetary gear set 11 runs in the blocked condition. This is because of the opening of the clutch 14, between the internal gear 18 and the cover 4, and the simultaneous closing of the clutch 15, between the sun gear 16 and the drive shaft 6. The generated torque is transmitted to the rotor 9 by means of drive shaft 6 through the closed clutch 15 and then over the shaft 12.

Figure 5:
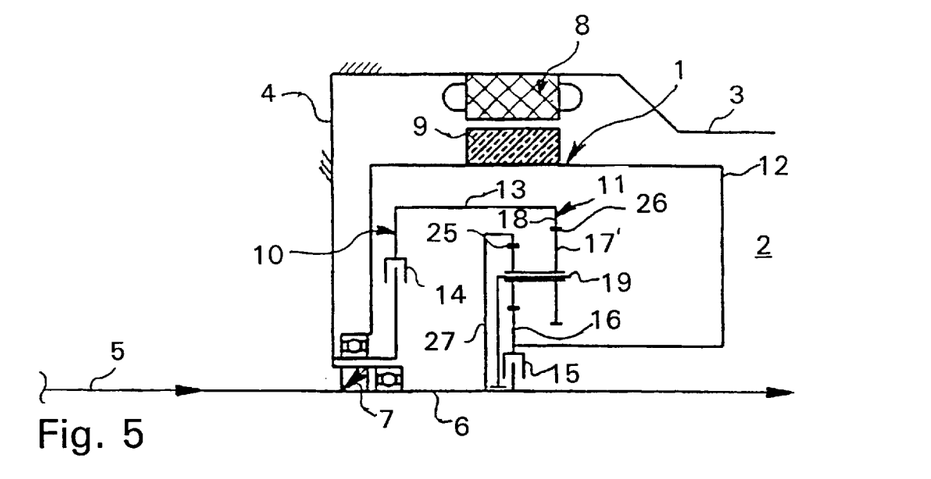
FIG. 5 is a planetary gear set of a starter and generator unit with stepped planet gears, a sun gear and two internal gears.

In FIG. 5, a variant planetary gear set 11 is here presented with a stepped planetary gear 17', as is shown in FIG. 4, a sun gear, a first large internal gear 18, which can be connected to the housing cover 4 by means of the clutch 14, and further with a second small internal gear 27.

By means of the design of the planetary gear set 11, with the small internal gear 27, which is firmly connected to drive shaft 6, even higher gear ratios can be achieved, namely i>6, than is the case in the arrangement shown in FIG. 4, whereby the large internal gear 18, in comparison with FIG. 4, can be dimensioned to be smaller or equally large.

In the case of the variant depicted in FIG. 5, the large internal gear 18 is stationary during the start operation and the torque from the electrical machine 8 is introduced by the sun gear 16 to the stepped planetary gears 17', from which it is transferred to the drive shaft 6 by means of the small internal gear 27. The torque transfer, during normal drive mode, that is in the generator operation, runs as described in FIG. 4.

Figure 6:
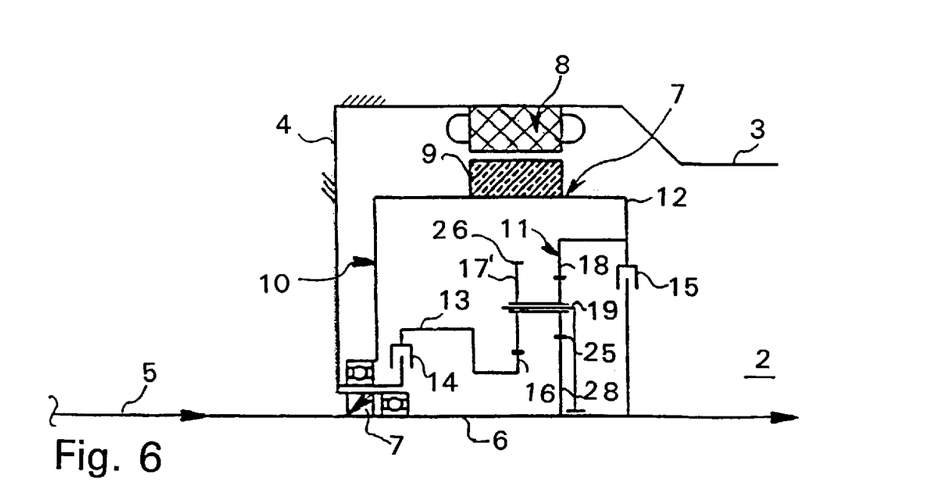
FIG. 6 is a planetary gear set of a starter and generator unit with stepped planet gears, two sun gears and one internal gear.

In FIG. 6, another planetary gear set 11, is shown with illustrated stepped planetary gears 17', one internal gear 18, a first small sun gear 16 and a second large sun gear 28. In this arrangement, the internal gear 18 is connected with the shaft 12 which also is connected to the electrical machine 8 as well as to the clutch 15 which leads to the drive shaft 6. The small sun gear 16 is connected to the shaft 13 which, in turn, is connected to the housing cover 4 through the clutch 14. The large sun gear 28 rotates with the drive shaft 6.

By this solution to transmission problems, which in any case provide high ratios with the use of small diameters of the internal gears, the sun gear 16 is stationary at the start operation, whereby the torque of the electrical machine 8 is directed through the internal gear 18 and, by means of the large sun gear 28, is transmitted to the drive shaft 6. The generator operation in normal operation again is analogous to that generator operation described for FIG. 4.

Figure 7:
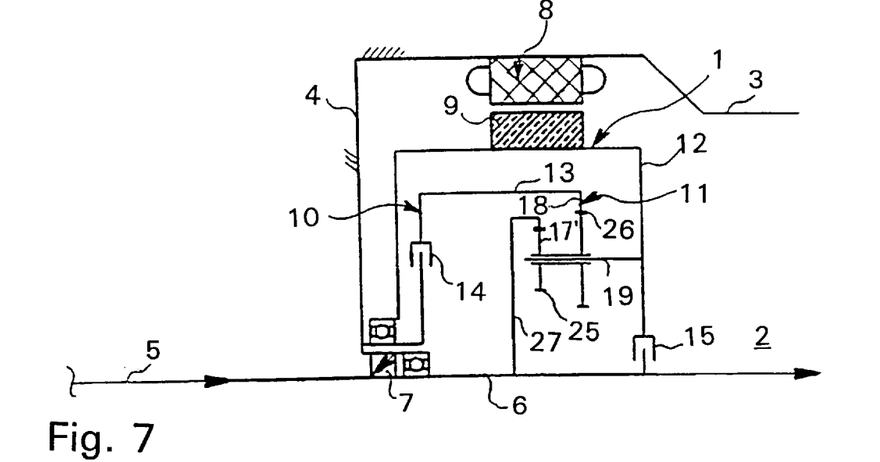
FIG. 7 is planetary gear set of a starter and generator unit with stepped planet gears and two internal gears.

FIG. 7 shows a design of the planetary gear set 11 with a stepped planetary gear 17', a first large internal gear 18 and a second small internal gear 27, similar to the design of FIG. 5, wherein in this case, however, the sun gear has been dispensed with. Instead of the sun gear, the shaft 12, which carries the rotor 9 of the electrical machine, is of one-piece construction with the planet carrier 19 and connectable to the drive shaft 6 by means of the clutch 15.

Since, the sun gear is not used with this method, this arrangement is advantageously very favorable from a cost standpoint.

If one observes the path of the torque during the start operation, then the large internal gear is fixed from turning, and the torque of the electrical machine is directed by the shaft 12 to the stepped planetary gear 17' and, from there, transferred to the drive shaft 6 by means of the small internal gear 27.

During the normal driving mode, the planetary gear set 11 is in the blocked condition as has been described with the description of FIG. 4.

Figure 8:
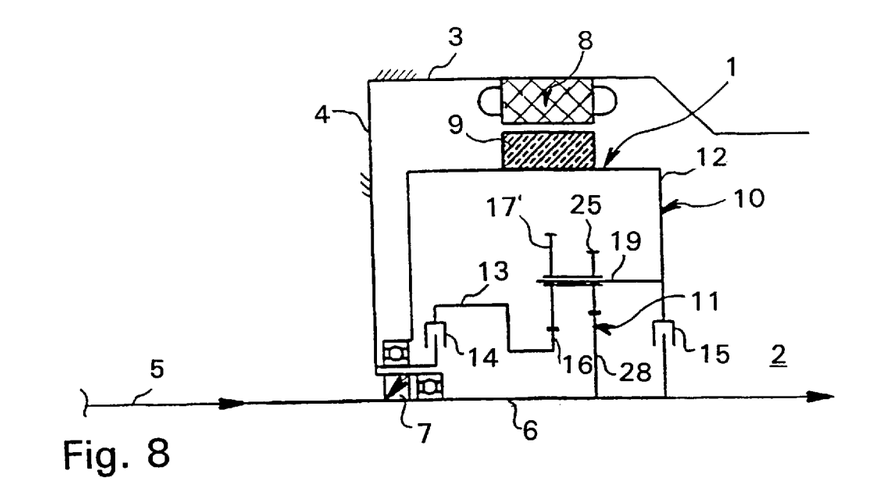
FIG. 8 is a planetary gear set of a starter and generator unit with stepped planet gears and two sun gears.

Finally, FIG. 8 shows still another design of a planetary gear set 11 with stepped planetary gears 17', a small sun gear 16 and a large sun gear 18, similar to FIG. 6, whereby one internal gear has been eliminated in this case which likewise, in an advantageous way, contributes to reducing the cost.

During the starting operation, the sun gear 16, which is connected with the train leading through clutch 14 to the housing cover 4, is stationary. The torque of the electrical machine is then directed over the shaft 12, which carries the rotor 9, to stepped planet gears 17'. From the said stepped planet gears 17', the torque is transferred to the drive shaft 6 by the large sun gear 28.

Figure 9:
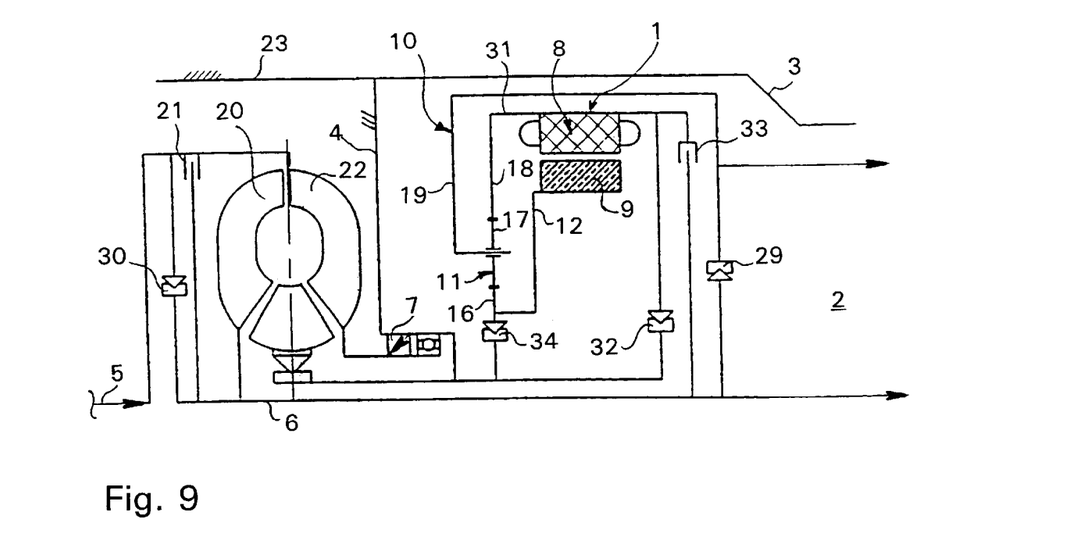
FIG. 9 is a starter and generator unit, which is placed, along with a torque converter, in a housing of a vehicle transmission whereby the planetary set of the starter and generator unit is made with available gear sets.
Figure 10:
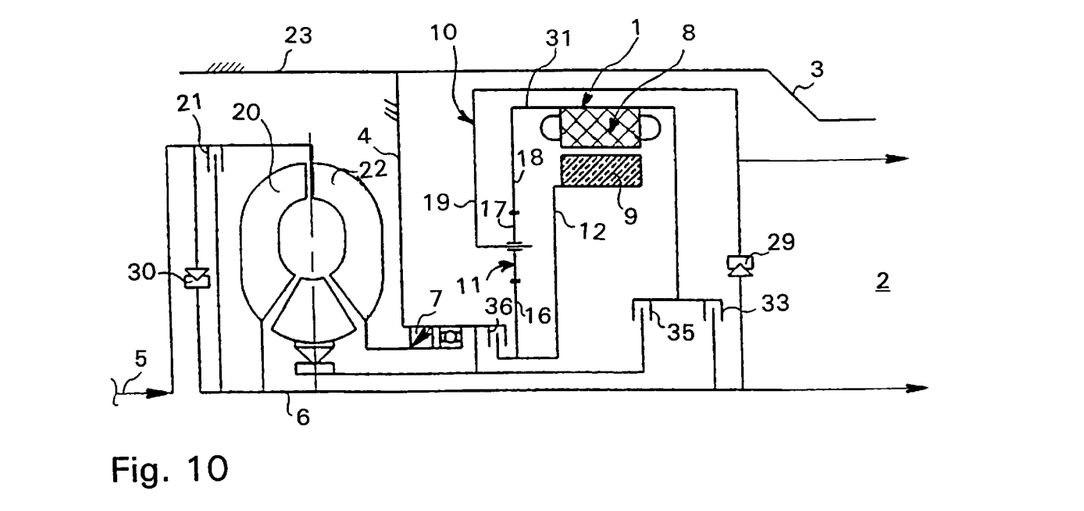
FIG. 10 is an alternative to the construction scheme of FIG. 9 of a starter and generator unit with available gear sets.

FIGS. 9 and 10 respectively show a starter and generator unit 1 in a transmission 2 with a torque converter 20, whereby the planet drive 10 of the starter and generator unit 1 makes use of the drive components, already on hand during the start operation, for the enhancement of its planetary gear set 11. In this way, an additional gear set can be eliminated.

In the embodiment depicted by FIG. 9, a customary planetary gear set 11 of the transmission 2 is used during the start-operation for the starter and generator unit 1.

During a start operation, the torque of the electrical machine 8 is transferred by means of the rotor 9 of the shaft 12, to the planetary gears 17 and to the planetary carrier 19, which is connected to the drive shaft 6 by means of an overrunning clutch 29, to the drive shaft 6 which, by means of an overrunning clutch 30, is connected to the crankshaft 5. As this occurs, the internal gear 18 is supported on the housing 3 of the vehicle transmission 2 by means of a shaft 31, which carries the electric machine and an overrunning clutch 32. The overrunning clutch 34 is found in the overtaking condition and transfers no torque as long as the clutch element 33 is open.

During the normal driving situation, the generated torque is transmitted by the drive shaft 6 through the now closed overrunning clutch 33 and from thence, by means of shaft 31, to the electric machine 8. The sun gear 16 and the rotor 9 are supported by the cover 4 of the housing 3 by means of the shaft 12 and the overrunning clutch 34, now in the overrun condition. The overrunning clutches 29 and 32 are now also in the overrun condition. By means of the internal gear 18 connected with the shaft 31, the torque is directed to the planetary gear set and, by means of the spider 19, transferred with a ratio to "slow" to the vehicle transmission 2.

The manner of functioning of the embodiment shown in FIG. 10 is analogous to the above. Instead of the overrunning clutches 32, 34, only being active on one side, clutches 35 and 36 are installed in this case.

FIGS. 11–14 show different designs of clutches by means of which, in the driving mode, the planetary gear set 11 can be blocked wherein sun gear 16, internal gear 18 and planetary carrier 19, when in the blocked condition, all exhibit the same speed of rotation.

Figure 11:
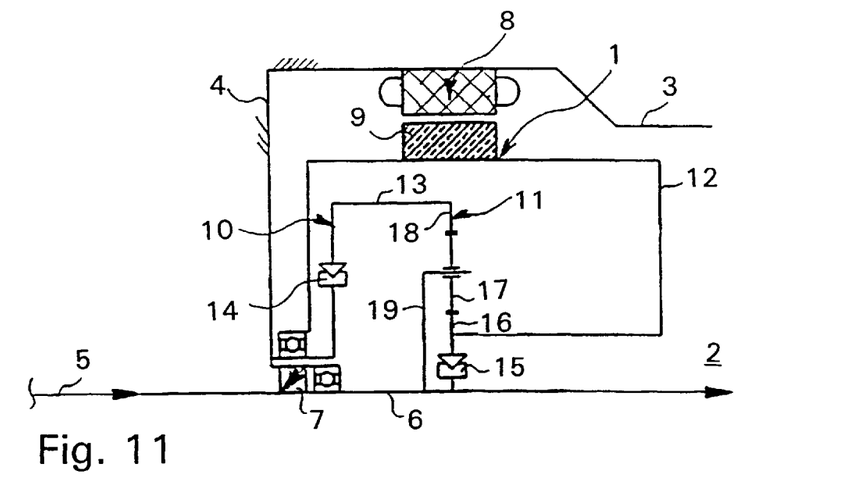
FIG. 11 is a planetary gear set of a starter and generator unit with an overriding clutch for blocking the planetary gear set during the generator operation.

In FIG. 11 it can be seen that the clutch 15 is designed as an overrunning clutch, described in relation to FIGS. 1 to 3.

By means of clutch 15, the planetary gear set 11, during the driving mode, is blocked and adjusted to a ratio of i=1. The installation of the overrunning clutch 15, in this application, has the advantage that no clutch element control is necessary.

During the start procedure, the overrunning clutch 15 finds itself in the overrun mode, that is, no torque can be transmitted over the clutch 15 and the overrunning clutch 14, which connects the internal gear 18 with the cover 4 of the housing 3, likewise as an overrunning clutch 14 is in the blocking condition. In the driving mode, i.e. the generator operation, the overrunning clutch 15 leading to the drive shaft 6, switches to the blocking condition, and the overrunning clutch 14, which leads to the housing 3, switches to the overrun condition.

Figure 12:
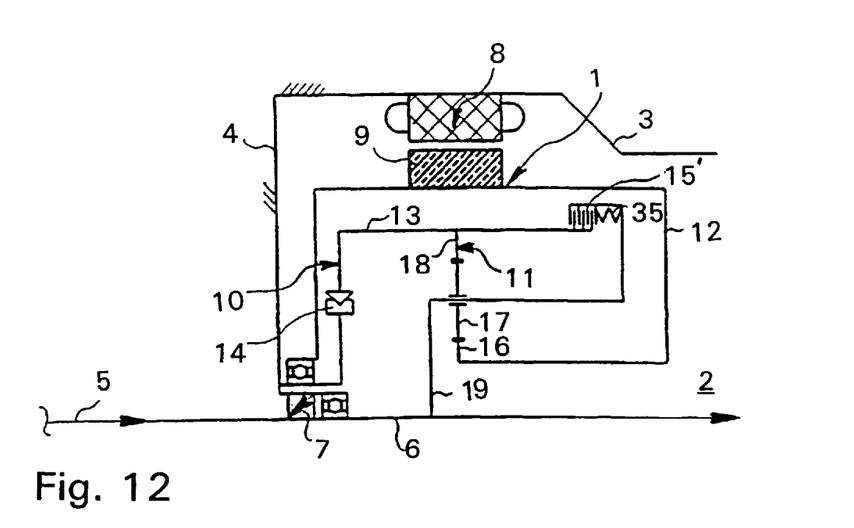
FIG. 12 is a planetary gear set of a starter and generator unit with a torque activated clutch to block the planetary gear set in the generator operation.

In FIG. 12, the clutch, by means of which the planetary gear set 11 in the generator drive can be blocked, is designed as a torque activated clutch 15' which likewise requires no clutch control element.

The internal gear 18, during the start procedure, is held fixed by the overriding clutch 14 leading to the housing 3 or, alternatively, by a solenoid switch which invokes a holding means (not shown). Between the internal gear 18 and the planetary carrier 19, which is connected to the drive shaft 6, in this case a continuance of the crankshaft 5, is to be found the said clutch 15' which is designed as a multiplate clutch, loaded with a spring 35 and activated by torque with friction lining. The precompression of the said spring is so designed that the clutch 15', upon transmitting the generator torque, does not slip. During the start procedure, the electrical machine 8, 9 must additionally produce a torque which will overcome the friction of the clutch.

A designed self-reinforcing ball-ramp-system is built into the clutch 15', which is not further described, so that the clutch 15', during the start procedure, is less pre-stressed than during the generator operation. If the start procedure is stopped, then the overrunning clutch 14 releases the internal gear 18. The torque activated clutch 15' then performs a speed of rotation equalization between the internal gear 18 and the spider or planetary gear carrier 19. When the difference in rotation speed lessens, then the entire planetary gear set 11 turns as one with a ratio of i=1 and remains so until stopping of the motor, that is, until the motor is restarted.

The layout in accord with FIG. 12 has the advantage, apart from other considerations such as vibration from the crankshaft, that a difference is recognized between the start operation and the generator operation whereby, during the generator operation, a fixed ratio of i=1 can be relied upon.

Additionally, with this arrangement, an overload protection is provided upon stopping the motor since the clutch, under these circumstances, can slip.

Figure 13:
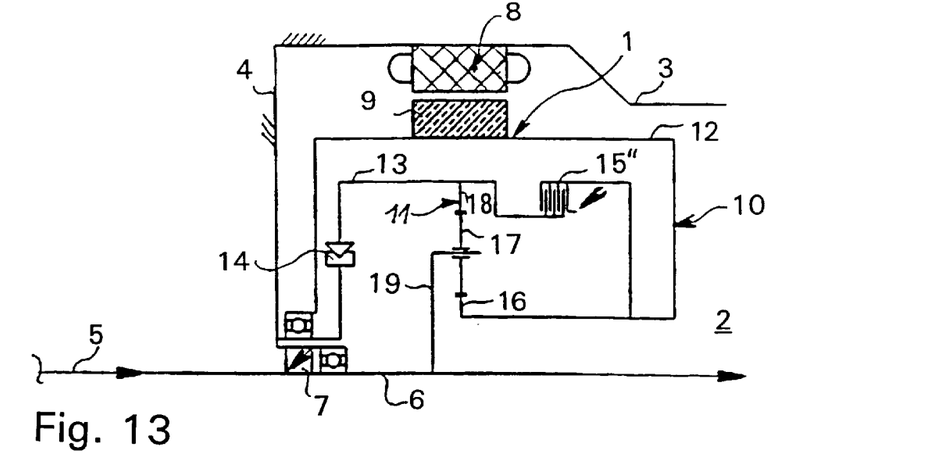
FIG. 13 is a planetary gear set of a starter and generator unit with one, controlled, hydraulic activated clutch for blocking the planetary gear set during the generator operation.

FIG. 13 shows a controlled clutch 15" for blocking the planetary gear set during normal driving.

Following the startup procedure, the hydraulically activated clutch 15" is actively shut whereby the control in the present design acts by means of bleed-off from the oil pump of the originally built-up hydraulic pressure during a normal driving mode of the vehicle transmission.

Advantageously, with the variant design according to FIG. 13, a starter and generator operation during the driving mode is possible with a 1:1 ratio whereby the control of the clutch 15" can be executed without any control element.

Figure 14:
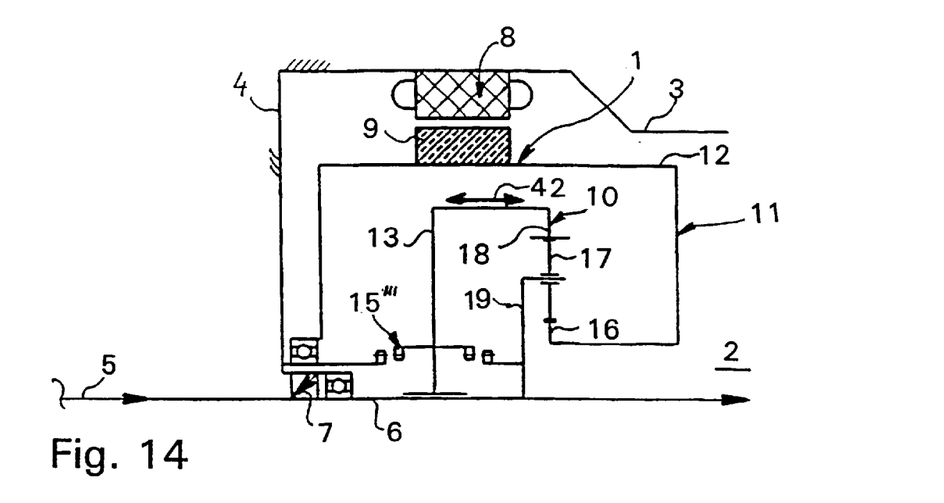
FIG. 14 is a planetary gear set of a starter and generator unit with a dog-clutch for blocking the planetary gear set during the generator operation.

As FIG. 14 shows, blocking of the planetary gear set 11 can be done also by means of a clutch 15''' which requires a very small expenditure in time or costs for installation.

The dog clutch 15''' likewise makes a 1:1 ratio during the generator drive possible since said clutch, in combination with the internal gear 18 on an axially displaceable shaft 13, and the planet carrier 19, are bound together by means of an axial force and an axial motion (arrow 42) engendered by a helical gearing in the planetary drive 10. During the start operation, by reversal of the torque direction and therewith associated direction reversal of the axial force, the internal gear 18, by means of the dog clutch 15''', is connected with the housing 3, i.e., with the cover 4 thereof.

The required synchronous run for the dog clutch 15''', in this case, is supplied by the electrical machine 8.

In the FIGS. 15 to 18, examples of an application of the planetary drive 10 are shown during the travel mode relating to drive of the oil pump 24 of the vehicle transmission 2 in the area of rotational speed for reduced pump delivery.

By the shown methods of operation in which the oil pump 24 is, in every case, connectable to the drive shaft by means of a centrifugal clutch 36, the advantage is provided that the oil pump can be dimensioned smaller than is conventional.

Figure 15:
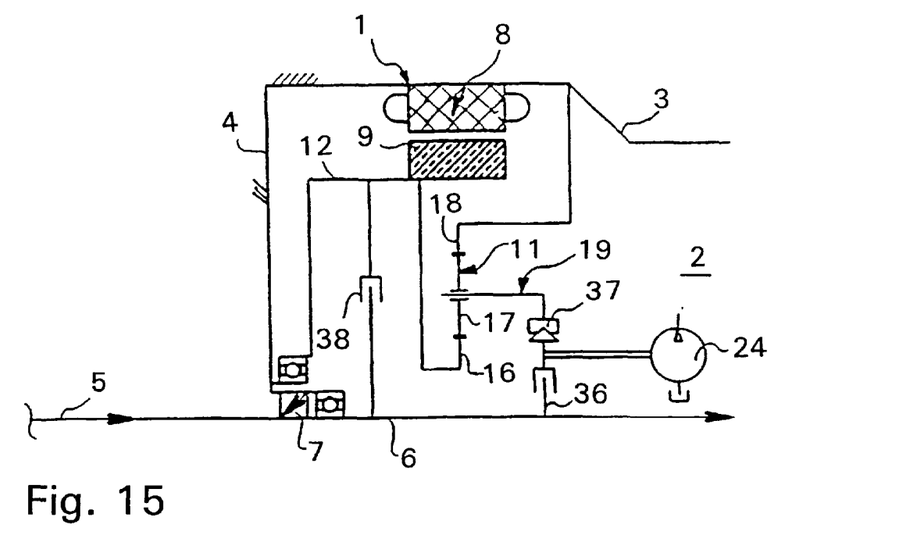
FIG. 15 is a planetary gear set of a starter and generator unit which is connected to an oil pump of the vehicle transmission.
Figure 16:
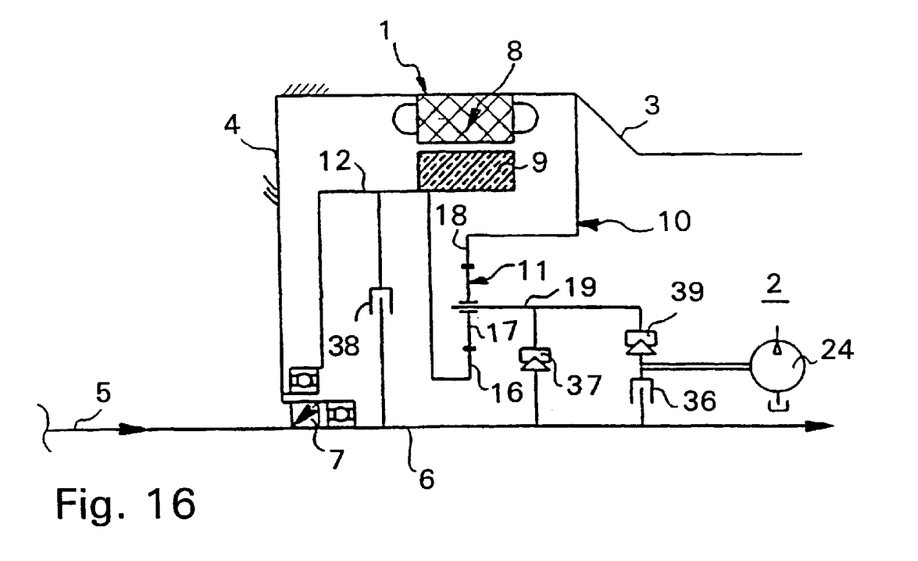
FIG. 16 is a further planetary gear set of a starter and generator unit which is connected to an oil pump of the vehicle transmission.

In the cases of the variants, in accord with FIG. 15 and FIG. 16, the internal gear 18 of the planetary gear set 11 is stationary in both cases. During the start operation, the torque is transmitted by means of the sun gear 16 and by the planet carrier 19 and an overrunning clutch 37 to the crankshaft 5, which is to say, with the drive shaft 6 which, in this case, turns with the said crank shaft 5. During the generator operation, a clutch 38 is closed and the overrunning clutch 37 goes into the overrun state.

In the case of the variant shown in FIG. 15, the oil pump 24 and the centrifugal clutch 36 operate between the overrun clutch 37 and the drive shaft 6.

The centrifugal clutch 36 opens upon a predetermined speed of rotation of the internal combustion motor, this being the rotational speed of the drive shaft 6, whereby the oil pump, prior to opening of the said centrifugal clutch 36, runs at the rotational speed of the crankshaft and subsequently with the planetary carrier speed of rotation which, in any case, is less.

In accord with FIG. 16, the oil pump 24 is placed between the overrun clutch 39 which, in this case, is parallel to the overrun clutch 37 and the centrifugal clutch 36.

By means of this parallel arrangement, the centrifugal clutch 36, in regard to the torque to be transferred, can be designed on the torque taken by the pump, that being, the torque as is necessary for drive of the oil pump 24 since the starting torque, different from that of the embodiment in accord with FIG. 15, in this case can be transmitted by means of the overrunning clutch 37.

Figure 17:
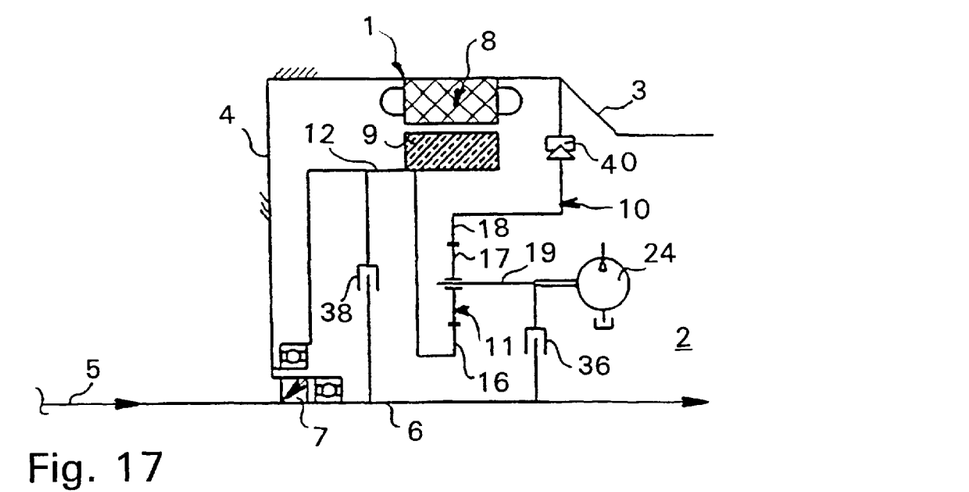
FIG. 17 is a further planetary gear set of a starter and generator unit which is connected to an oil pump of the vehicle transmission.

The layout in accord with FIG. 17, predominately represents the method of FIG. 15 except, in place of the overrunning clutch 37, an overrunning clutch 40 is placed between the internal gear 18 and the housing 3.

During the start operation, the internal gear 18 of the planetary gear set 11 is supported by the housing 3 through the overrun clutch 40, and the torque of the electrical machine 8 is conducted through the sun gear 16 to the planetary carrier 19 and to the drive shaft by means of the centrifugal clutch 36.

During generator operation, the clutch 38 is closed and the overrunning clutch 40 goes into the overrun state. The conditions at the oil pump 24 are represented by those described in FIG. 15.

Figure 18:
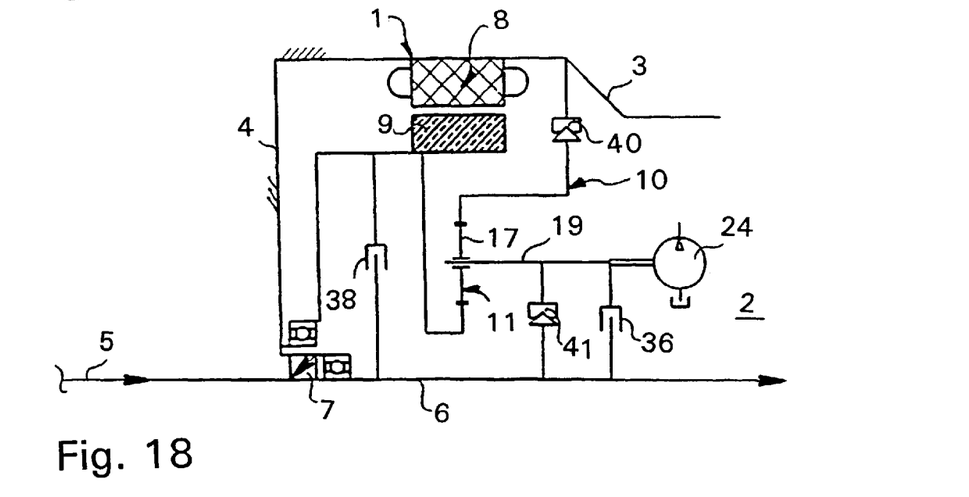
FIG. 18 is a further planetary gear set of a starter and generator unit which is connected to an oil pump of the vehicle transmission.

FIG. 18 shows an alternative parallel layout to the arrangement as shown in FIG. 16 wherein an overrunning clutch 41 is placed in parallel with the centrifugal clutch 36.

| Reference Numbers and Items | |
|---|---|
| 1 starter and generator unit | 19 planet carrier, spider |
| 2 assembly, vehicle transmission | 20 torque converter |
| 3 housing | 21 torque converter clutch |
| 4 cover of housing | 22 pump shell of the torque converter |
| 5 crankshaft | 23 torque bell casing |
| 6 drive shaft | 25 stepped gear, small |
| 7 sealing means | 26 stepped gear, large |
| 8 electrical machine | 27 second internal gear, small |
| 9 rotor of electrical machine | 28 second, sun gear, large |
| 10 planetary drive | 29 overrunning clutch |
| 11 planetary gear set | 30 overrunning clutch |
| 12 shaft, connected to rotor | 31 shaft |
| 13 shaft | 32 overrunning clutch |
| 14 overrunning clutch | 33 clutch |
| 15 overrunning clutch | 34 overrunning clutch |
| 15' clutch, torque activated | 35 spring, under stress for multiplate clutch |
| 15" clutch, controlled | 36 centrifugal clutch |
| 15'" clutch, dog type | 37 overrunning clutch |
| 16 sun gear, small | 38 clutch |
| 17 planetary gear | 39 overrunning clutch |
| 17' stepped planetary gear | 40 overrunning clutch |
| 18 internal gear, large | 41 overrunning clutch |

What is claimed is:

1. A drive system for a motor vehicle having a drive shaft (6) and an associated starter and generator unit (1), the drive system having an electrical machine (8, 9) operable both as a starting motor, during a starting mode of operation, and as an electric generator, during a generator mode of operation, and a planetary drive (10) with at least one sun gear (16, 28), at least one planetary gear (17, 17') and at least one internal gear (18, 27);

wherein the electrical machine (8, 9) is connectable with the drive shaft (6) via the planetary drive (10), by means of at least one additional shaft (12, 13, 31), and at least one clutch (14, 15, 15', 15", 15'", 29, 30, 32, 34, 36 to 41) to form a drive train such that, during the starting mode of operation, the drive train has a ratio i>1, and, during the generator mode of operation, the drive train has a ratio i=1; and the drive shaft (6) penetrates through a cover (4) and a seal is provided between the drive shaft (6) and the cover (4), and a housing (3) accommodates the starter and generator unit (1) and the housing (3), on a side facing a motor, is closed by the cover (4), an opposite side of the housing (3) is connected to a vehicle transmission (2);

both the electrical machine (8, 9) and the planetary drive (10) are accommodated within a housing (3) without being separated from one another by a partition.

2. The drive system according to claim 1, wherein the vehicle transmission (2) has a hydrodynamic torque converter (20), and a transmission housing of the hydrodynamic torque converter is constructed as a converter bell (23) and the starter and generator unit (1) is placed within the converter bell (23) on a side of the torque converter (20) remote from the vehicle transmission (2).

3. A drive system for a motor vehicle having a drive shaft (6) and an associated starter and generator unit (1), the drive system having an electrical machine (8, 9) operable both as a starting motor, during a starting mode of operation, and as an electric generator, during a generator mode of operation, and a planetary drive (10) with at least one sun gear (16, 28), at least one planetary gear (17, 17') and at least one internal gear (18, 27);

wherein the electrical machine (8, 9) is connectable with the drive shaft (6) via the planetary drive (10), by means of at least one additional shaft (12, 13, 31), and at least one clutch (14, 15, 15', 15", 15'", 29, 30, 32, 34, 36 to 41) to form a drive train such that, during the starting mode of operation, the drive train has a ratio i>1, and, during the generator mode of operation, the drive train has a ratio i=1; and the drive shaft (6) penetrates through a cover (4) and a seal is provided between the drive shaft (6) and the cover (4), and a housing (3) accommodates the starter and generator unit (1) and the housing (3), on a side facing a motor, is closed by the cover (4), and an opposite side of the housing (3) is connected to a vehicle transmission (2);

the vehicle transmission (2) has a hydrodynamic torque converter (20), for reception of a converter bell (23) transmission housing, and the starter and generator unit (1) is placed between the torque converter (20) and an oil pump (24) on a side of the torque converter (20) proximal to the vehicle transmission (2).

4. The drive system according to claim 3, wherein the drive shaft (6) is connected, via a pump shell (22) of the torque converter (20), to rotate along with a crankshaft (5) of the drive system.

5. The drive system according to claim 1, wherein the at least one planet gear (17') is a stepped planet gear associated with a small stepped planet gear (25) and a large stepped planet gear (26).

6. The drive system according to claim 1, wherein a planetary gear set (11) of the planetary drive (10) has at least one step planet gear (17'), one sun gear (16) and one internal gear (18), and, during the starting mode of operation, the internal gear (18) is stationary and the torque of the electrical machine (8, 9) is transferred by the sun gear (16) and a planet carrier (19) to one of the drive shaft (6) and a shaft (5) rotatably connected with the drive shaft (6), and during the generator mode of operation, a first clutch (14) between the internal gear (18) and the housing (3) opens and at least a second clutch (15) between the sun gear (16) and the drive shaft (6) closes so that the planetary gear set (11) rotates in a blocked condition.

7. The drive system according to claim 1, wherein a planetary gear set (11) of the planetary drive (10) includes at least one stepped planet gear (17'), one sun gear (16) and two internal gears (18, 27) whereby, during the starting mode of operation, a first internal gear (18) is stationary, by connection of the first internal gear (18) to the housing (3) via a first clutch (14), and torque from the electrical machine internal gear (27) and, during the generator mode of operation, the planetary gear set (11) rotates in a blocked condition by the first clutch (14) opening and by at least a second clutch (15), which leads to the drive shaft (6), closing.

8. The drive system according to claim 1, wherein a planetary gear set (11) of the planetary drive (10) has a stepped planet gear (17'), an internal gear (18), first and second sun gears (16, 28) and first and second clutches (14, 15), and, during the starting mode of operation, the second clutch (15) is disengaged and the first clutch (14) engaged to prevent rotation of the first sun gear (16) and torque from the electrical machine (8, 9) is transferred, via the internal gear (18), the stepped planet gear (17') and the second sun gear (28), to the drive shaft (6), and, during the generator mode of operation, the first clutch (14) is disengaged and the second clutch (15) engaged to block the planetary gear set (11) which rotates in a blocked condition with the drive shaft (6).

9. The drive system according to claim 1, wherein a planetary gear set (11) of the planetary drive (10) has a stepped planet gear (17'), a first and second internal gear (18, 27), a first sun gear (16) and first and second clutches (14, 15), and, during the starting mode of operation, the second clutch (15) is disengaged and the first clutch (14) engaged to prevent rotation of the first internal gear (18) and torque from the electrical machine (8, 9) is transferred, via the first sun gear (16), the stepped planet gear (17') and the second internal gear (27), to the drive shaft (6), and, during the generator mode of operation, the first clutch (14) is disengaged and the second clutch (15) engaged to block the planetary gear set (11) which rotates in a blocked condition with the drive shaft (6).

10. The drive system according to claim 1, wherein a planetary gear set (11) has a planetary carrier (19) supporting a stepped planet gear (17'), first and second sun gears (16, 28) and first and second clutches (14, 15), and, during the starting mode of operation, the second clutch (15) is disengaged and the first clutch (14) engaged to prevent rotation of the first sun gear (16) and torque from the electrical machine (8, 9) is transferred, via the planetary carrier (19) and the second sun gear (28), to the drive shaft (6), and, during the generator mode of operation, the first clutch (14) is disengaged and the second clutch (15) engaged to block the planetary gear set (11) which rotates in a blocked condition with the drive shaft (6).

11. The drive system according to claim 7, wherein the first internal gear (18) is a larger internal gear and the second internal gear (27) is a smaller internal gear.

12. The drive system according to claim 8, wherein the first sun gear (16) is a relatively smaller sun gear and the second sun gear (28) is a relatively larger sun gear.

13. The drive system according to claim 5, wherein an overrunning clutch (15), leading to the drive shaft (6), is provided as the at least one clutch for blocking of a the planetary drive (10) during the generator mode of operation.

14. The drive system according to claim 5, wherein a torque activated clutch (15'), leading to the drive shaft (6), is provided as the at least one clutch for blocking the planetary drive (10) during generator mode of operation.

15. The drive system according to claim 5, wherein a controllable clutch (15"), leading to the drive shaft (6), is provided as the at least one clutch for blocking the planetary drive (10) during generator mode of operation.

16. The drive system according to claim 15, wherein the controllable clutch (15") is subjected to a principal pressure of the vehicle transmission (2).

17. The drive system according to claim 5, wherein a dog clutch (15'''), leading to the drive shaft (6), is provided as the at least one clutch for blocking the planetary drive (10) during the generator mode of operation.

18. The drive system according to claim 1, wherein the planetary drive (10) is connected with an oil pump (24) which, during a travel mode of operation, is driven with the planetary drive (10).

19. The drive system according to claim 18, wherein the oil pump (24) is connected with the planetary drive (10) and the oil pump (24) is connectable with the drive shaft (6) via a pump clutch (36), and the oil pump (24), below a preselected speed of rotation of the drive shaft (6) with the pump clutch (36) closed, is driven at a rotational speed equivalent to a rotation speed of the drive shaft (6), and the oil pump (24), above a predefined speed of rotation of the drive shaft (6) with the pump clutch (36) opened, is driven at a rotational speed equivalent to a rotation speed of a planet carrier of the planetary drive (10).

20. A drive system for a motor vehicle having a drive shaft (6) and an associated starter and generator unit (1), the drive system having an electrical machine (8, 9) operable both as a starting motor, during a starting mode of operation, and as an electric generator, during a generator mode of operation, and a planetary drive (10) with at least one sun gear (16, 28), at least one planetary gear (17, 17') and at least one internal gear (18, 27);

wherein the electrical machine (8, 9) is connectable with the drive shaft (6) via the planetary drive (10), by means of at least one additional shaft (12, 13, 31), and at least one clutch (14, 15, 15', 15", 15''', 29, 30, 32, 34, 36 to 41) to form a drive train such that, during the starting mode of operation, the drive train has a ratio i>1, and, during the generator mode of operation, the drive train has a ratio i=1; and the drive shaft (6) penetrates through a cover (4) and a seal is provided between the drive shaft (6) and the cover (4), and a housing (3) accommodates the starter and generator unit (1) and the housing (3), on a side facing a motor, is closed by the cover (4), an opposite side of the housing (3) is connected to a vehicle transmission (2);

both the electrical machine (8, 9) and the planetary drive (10) are accommodated within a housing (3) without being separated from one another by a sealed partition, and the electrical machine (8, 9) and the planetary drive (10) are located radially with respect to one another.

\* \* \* \* \*